(12) United States Patent
Bartha et al.

(10) Patent No.: US 11,356,580 B1
(45) Date of Patent: Jun. 7, 2022

(54) METHOD FOR PREVENTING SCREEN CAPTURE

(71) Applicant: Tresorit Kft., Budapest (HU)

(72) Inventors: Péter Bartha, Budapest (HU); István Lám, Budapest (HU); Péter István Budai, Veszprém (HU); Dániel Krausz, Budapest (HU)

(73) Assignee: Tresorit Kft., Budapest (HU)

( * ) Notice: Subject to any disclaimer, the term of this patent is extended or adjusted under 35 U.S.C. 154(b) by 0 days.

(21) Appl. No.: 17/356,256

(22) Filed: Jun. 23, 2021

(51) Int. Cl.
*H04N 1/44* (2006.01)
*G06F 21/84* (2013.01)
*G06F 3/14* (2006.01)

(52) U.S. Cl.
CPC ......... *H04N 1/4493* (2013.01); *G06F 3/1454* (2013.01); *G06F 21/84* (2013.01)

(58) Field of Classification Search
CPC ...... H04N 1/4493; G06F 3/1454; G06F 21/84
See application file for complete search history.

(56) References Cited

U.S. PATENT DOCUMENTS

| | | |
|---|---|---|
| 7,305,713 B1 | 12/2007 | Crance |
| 8,189,781 B1 | 5/2012 | Hartman |
| 9,740,860 B2 | 8/2017 | Song |
| 10,037,746 B2 | 7/2018 | Priede |
| 10,095,964 B1 | 10/2018 | Edwards et al. |
| 2003/0123663 A1 | 7/2003 | Epstein et al. |
| 2009/0064348 A1 | 3/2009 | Bang et al. |
| 2015/0007351 A1* | 1/2015 | Janajri ............... H04L 51/00 726/30 |
| 2015/0371613 A1* | 12/2015 | Patel ................. G06T 1/60 345/549 |
| 2016/0246999 A1 | 8/2016 | Pielot |
| 2016/0253772 A1* | 9/2016 | Kofod ............... G06T 1/0021 382/100 |
| 2018/0167674 A1* | 6/2018 | Shadrin ............. G06F 21/16 |
| 2018/0189505 A1* | 7/2018 | Ghafourifar ....... G06F 21/6209 |

FOREIGN PATENT DOCUMENTS

WO   WO2014120892 A2   8/2014

OTHER PUBLICATIONS

Author Unknown, "ArtistScope—The Founder of Copy Protection," Website of ArtistScope Pty Limited, (retrieved) Mar. 3, 2021, https://artistscope.com/company.as 5 pages.

* cited by examiner

*Primary Examiner* — Justin S Lee
(74) *Attorney, Agent, or Firm* — Aslan Law, P.C.

(57) ABSTRACT

A screen capture prevention method includes serving a single-color, DRM-protected video clip for display as a background for a document on a web browser. The document is processed to render its background color as transparent. Content of the document is viewable over the contrasting video clip background. When a screen capture event is detected, the video clip is changed to a same color as the content of the processed document, rendering the content indistinguishable from the background while the screen capture event is active.

26 Claims, 5 Drawing Sheets

METHOD FOR PREVENTING SCREEN CAPTURE

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

According to an embodiment, a computer readable medium may have stored thereon instructions for execution by a server computer. The instructions may include transmitting video data to a second computing device and transmitting data representing an electronic document to the second computing device. The video data may depict only a field in a first color for display. The video data may be used as a background for a document to be displayed, and may include a security encoding that permits only authorized viewing of the video data. The data representing the electronic document may be processed by the second computing device to permit display, in a second color, of only the content of the processed document in front of the video data, such that the video data provides background color for the document.

According to an embodiment, a computer readable medium may having stored thereon instructions for execution by the second computing device. The instructions include displaying a background region for at least a portion of content of a document by playing, on a display of the computing device, the video data depicting only a first color including a security encoding. The instructions further include displaying, over at least the background region, the at least a portion of the content of the document, the at least a portion of the content being presented in only a second color. When either of a screen capture event or a screen sharing event is detected in the computing device, the instructions permit the background region to display the second color such that the content of the document is indiscernible against the second color.

Further scope of applicability of the present invention will become apparent from the Detailed Description given below. However, it should be understood that the Detailed Description and specific examples, while indicating preferred embodiments of the present invention, are given by way of illustration only, since various changes and modifications within the spirit and scope of the present invention will become apparent to those skilled in the art from this Detailed Description.

BRIEF DESCRIPTION OF THE FIGURES

These and other objects, features and characteristics of the present disclosure will become more apparent to those skilled in the art from a study of the following Detailed Description in conjunction with the appended claims and figures, all of which form a part of this specification. In the figures:

The headings provided herein are for convenience only and do not necessarily affect the scope or meaning of the claimed invention.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples of the present invention will now be described. The following description provides specific details for a thorough understanding and enabling description of these examples. One skilled in the relevant art will understand, however, that the present invention may be practiced without every disclosed detail. Likewise, one skilled in the relevant art will also understand that the present invention may additionally include inherent features or features obvious to one skilled in the art which are not described in detail herein. Additionally, some well-known structures or functions may not be shown or described in detail below, so as to avoid unnecessarily obscuring the relevant description.

Descriptions of well-known starting materials, processing techniques, components and equipment may be omitted so as not to unnecessarily obscure the present invention in detail. It should be understood, however, that the detailed description and the specific examples, while indicating (e.g., preferred) embodiments of the present invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk drive, flash drive or other memory), hardware circuitry or the like, or any combination.

Figure 1:
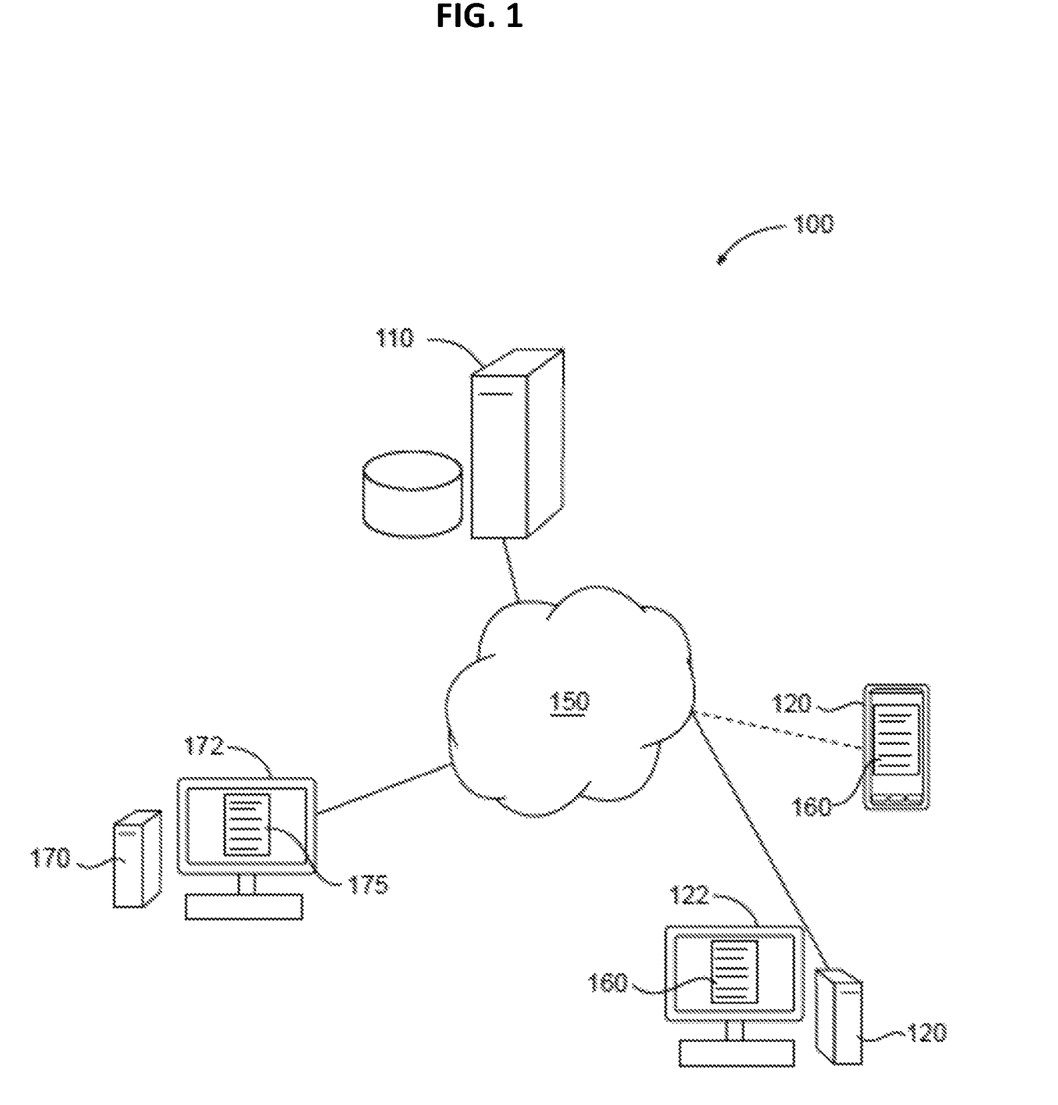
FIG. 1 depicts a system for preventing screen capture of a secure document, according to an embodiment.

FIG. 1 depicts a system 100 for preventing screen capture of a secure document, according to an embodiment. A server computer 110 of the system 100 may provide to one or more receiving computer(s) 120 (also referenced herein as computing device or second computing device), via a network 150, and a processed document 160 for display on a screen 122 of the receiving computer. According to an embodiment, a document owner may direct the display of the processed document 160 on the screen 122 via a sharing session on a sharing computer 170. The receiving computer 120 may be a desktop computer, laptop, smart phone, tablet, network appliance, terminal, or the like.

The server computer 110 may comprise one or more computing nodes in a server farm, or in some embodiments may be a stand-alone server having one or more processors, memory and data storage elements, network addressed storage, or the like. In some embodiments the server may include a cloud service, such as AMAZON WEB SERVICES (AWS), MICROSOFT AZURE, GOOGLE CLOUD, or the like for computing services, storage services and/or networking services.

The network 150 may be the Internet, or the system 100 can in some embodiments be implemented in a local area network (LAN). Communication over the network may in non-limiting embodiments use hypertext transport protocol (HTTP) for document sharing, and may employ a virtual private network (VPN) or other secure network connection protocols or means.

The sharing computer 170 may be a desktop computer, laptop computer, smart phone, tablet, or the like, capable of accessing documents stored via the server 110 and authorizing the receiving computer(s) 120 to display a processed document 160 transmitted to the receiving computer(s) 120 from the server computer 110. For example, a user of the sharing computer 170 may, via a web browser or installed application, utilize a service provided by the server computer 110.

In an exemplary embodiment, the user of the sharing computer 170 may access a document 175 stored by the user to the server computer 110 or stored via the server computer 110. Via a service of the server computer 110 accessible through an application or website via the sharing computer 170, the user may identify the document 175 for sharing to a second party via a screen sharing application (e.g., SKYPE, ZOOM, MICROSOFT TEAMS or the like). The document may thus be shared to and displayed by the screen 122 of the receiving computer 120.

The inventors have recognized that conventional screen-sharing schemes alone display a document with minimal security. Although some conventional screen-sharing schemes may prevent selection and copying of specific text or objects in a shared document, they do not prevent screen capturing. Many applications, including some packaged with modern operating systems, permit a user to capture anything showing on their computer screen. Specifically, conventional screen-sharing applications do not prevent a screen sharing viewer from capturing the contents of the screen 122 or a portion thereof—an action that may undermine intentions to keep the document and its contents secure and to limit distribution thereof. Disclosed herein is a method of securing the display of a document to prevent screen capture via screen capture applications.

Figure 2:
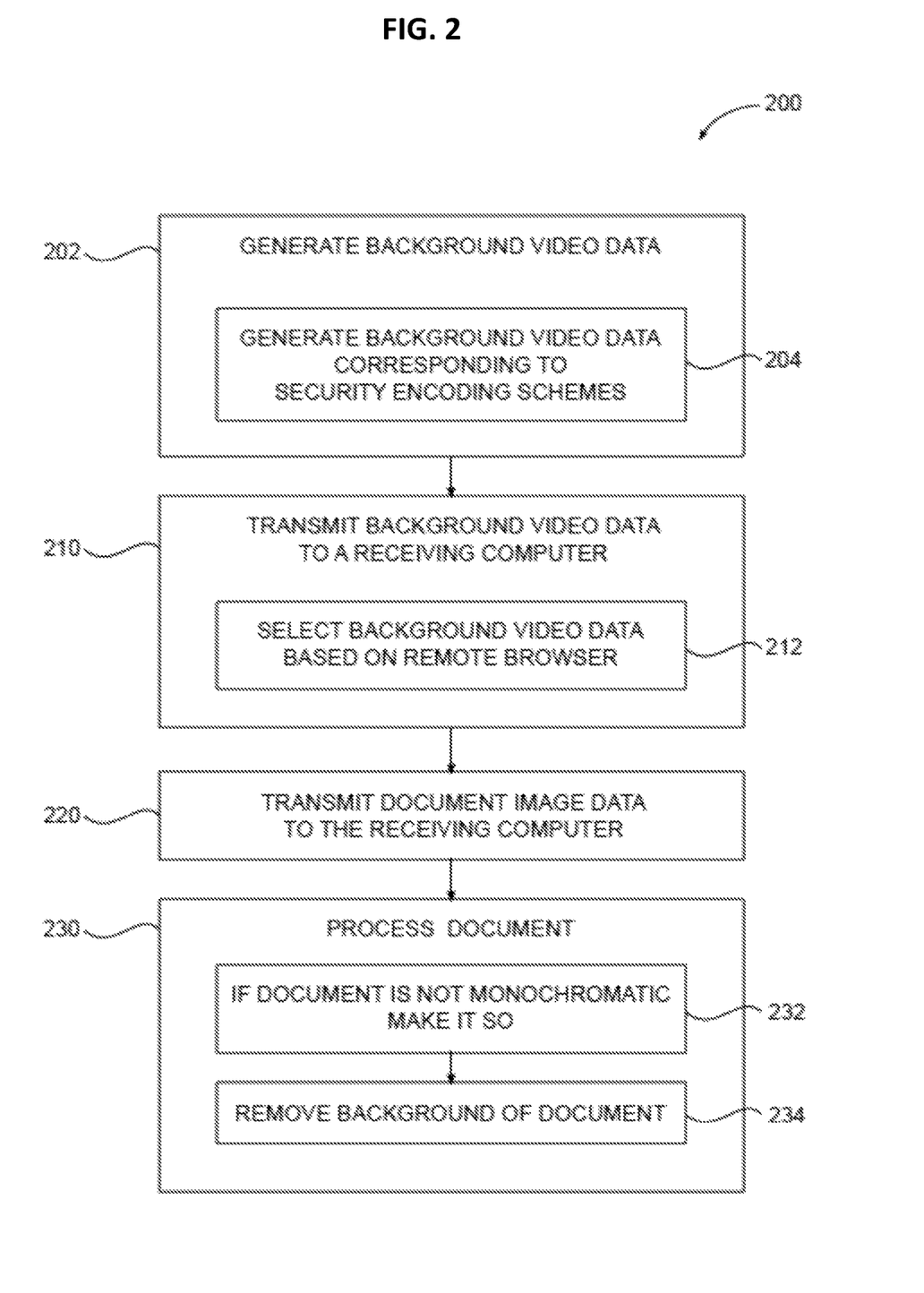
FIG. 2 is a flowchart for a method of preventing screen capture of a document, according to an embodiment.

FIG. 2 is a flowchart for a method 200 of preventing screen capture of a document, according to an embodiment. The method 200 may be implemented in a set of instructions or operations, stored on a non-transitory computer-readable medium (e.g., ROM, HDD, SSD, or the like) and executable by the processor of a computer such as a server computer 110. The instructions may include, in operation 210, transmitting background video data to a second computing device, such as the receiving computer 120, for display on a display device, such as screen 122. The background video data may depict a single-color field in a first color, and is used as a background for electronic document image data to be displayed. The video data may include a security encoding that permits only authorized viewing of the video data. For example, the securing encoding may be one that complies with a digital rights management (DRM) or data encryption scheme, such as APPLE's FAIRPLAY, MICROSOFT's PLAYREADY, and/or GOOGLE's WIDEVINE, each permitting decryption via an Encrypted Media Extension.

In operation 220, the method 200 may include transmitting, from the server computer (e.g., 110), document image data representing an electronic document to the second computing device (e.g., 120). The document image data may be processed (operation 230) at the second computing device to remove a background. In some embodiments, the document image data may be preprocessed at the server computer prior to transmission thereof to the second computing device. Processing the document (i.e., the document image data), may include determining, in operation 232, whether or not the document is monochromatic, in particular having a first color and a second color, e.g., black and white. If the document image data is determined to not be appropriately monochromatic, the processing in operation 232 includes converting the document image data to be monochromatic, e.g., black text on white background. For example, if the document includes color other than a predetermined first color for background and a second predetermined color for content, such as shades of gray, the processing operation 232 converts the document to have only the first and second colors. If the document image data is determined to be appropriately monochromatic—having the first color for background and the second color for content before or after operation 232—the first color is removed in Step 234. For example, if the document comprises black text on white background, the white background is made indiscernible, such as making the background color transparent. Alternatively, operations 232 and 234 may be combined such that when document image data is determined to be non-monochromatic, or inappropriately monochromatic, the operation of converting the document image data to monochromatic may include converting content to the second color and the background directly to transparent rather than first converting it to the first color. In another embodiment, the processing of the document may be performed at the server computer 110 prior to transmission of the document image data to the second computing device.

As described above, the processing operation 230 may permit display, in a second color (e.g., black), of only the content of the processed document. The content may then be displayed in front of the video data, such that the video data provides background color in the first color for the document content displayed in the second color, (e.g., black text on white background).

The process operation 230 may include determining whether or not the document is monochrome (e.g., black and white). If the electronic document is monochrome, the processing of the document may further include determining whether or not the background color of the electronic document is the first color (e.g., white). If the electronic document is not monochrome, or if the background color of the electronic document is not the first color, the processing may include converting the electronic document to monochrome such that the background color is the first color and the content of the electronic document is the second color, e.g., black text on a white background.

Prior to operation 210, the method 200 may include an operation 202 of generating the background video data. This operation may include a sub-operation 204 of generating a plurality of video data instances each corresponding to a respective security encoding variation. For example, one video data instance may be encoded for compliance with one securing encoding scheme (e.g., PLAYREADY), while another video data instance may be encoded for compliance with another securing encoding scheme (e.g., FAIRPLAY), etc. According to an embodiment, a single video data file may simultaneously include security encoding for multiple DRM schemes, for example including multiple portions each having a different DRM compliance. Corresponding to operation 204, the operation 210 transmitting background video data to the second computing device may include, in operation 212, selecting an instance of the video data from the plurality of video data instances, where the selected the instance of the video data may be based on browser information received from the second computer. For example, if the browser being used for viewing electronic files on the second computing device is reported to be GOOGLE CHROME, the server computer transmits background video data encoded in compliance with WIDEVINE.

The method 200 may further include receiving, processing, and storing the electronic document by the server computer.

The processing operation 230 may include placing in the electronic document a parameter for secure display of the electronic document. The parameter may in some embodiments include a digital watermark In rendering the background of a document indiscernible or transparent, the processing operation 230 may cause all non-content elements of the electronic document to be displayed as a transparency. In some embodiments, the transparent background of the electronic document may include an electronic "watermark." The electronic watermark may be visible or non-displaying/invisible. In some embodiments, the watermark may include a message such as "Protected by (company name) DRM". In other embodiments, the watermark may provide a means of identifying the document, its origin, and/or owner. In some instances, the electronic watermark may be generated uniquely for each display of the document, including information about one or more of an IP address of a source or destination, information of a requester (name, email address, and/or etc.), a date and time, information describing a browser and/or operating system, and the like. In some embodiments, the watermark may be clearly discernible only when a screen capture command is engaged.

Transmitting the data representing the electronic document to the second computer, in operation 220, may be performed in response to receiving a request to provide document data for presentation of the document file on a display (e.g., display 122) of the second computer (e.g., computer 120) wherein the electronic document may be accessible for transmission via the server computer (e.g., server computer 110).

In some embodiments, the transmitting of the data representing the electronic document to the second computer in operation 220 may include transmitting a decoding license for decoding of the security encoding. Transmitting of such decoding license may be performed in response to receiving, from the second computing device, a request for the decoding license.

The transmitting of the video data to the second computing device in operation 210 may include transmitting a media stream of the video data. That is, the video data may be streamed continuously during the display on the second computing device, according to an embodiment. Alternatively, the operation 210 of transmitting video data to the second computing device may include transmitting an entire video file to the second computing device, where it may be played back or looped continuously during display of the electronic document. In some embodiments, the transmitted video data may include a single frame that may be looped during display of the document. Of course, one of skill in the art will acknowledge that the background video data may include a multi-frame video clip in an embodiment.

Figure 3:
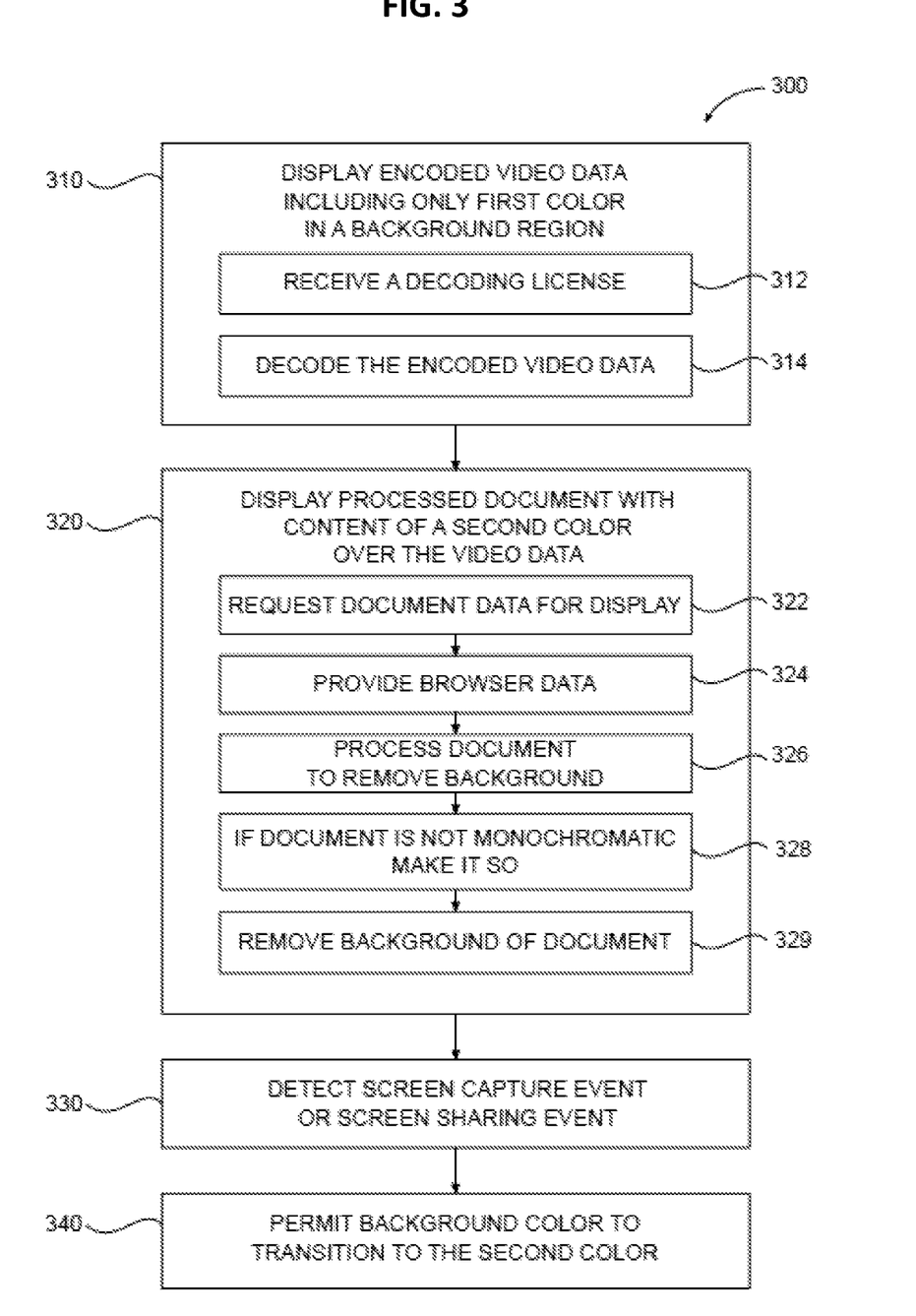
FIG. 3 is a flow chart of a method for displaying a secure document on a computing device, according to an embodiment.

FIG. 3 is a flow chart of a method 300 for displaying a secure document on a computing device, according to an embodiment. The method 300 may be implemented by execution of a set of instructions or operations stored on a non-transitory computer-readable medium of a computing device (e.g., computer 120). The method 300 may include an operation 310 of displaying a background region corresponding to at least a portion of content of an electronic document by playing, on a display of the computing device, video data depicting only a first color (e.g., white), the video data including a security encoding. According to an embodiment, the background region may correspond to an entire visible portion of the content of electronic document. The security encoding may comply with an Encrypted Media Extension (EME). For example, the video data may include a security encoding that complies with an EME that includes a DRM scheme such as, but not limited to, FAIRPLAY, PLAYREADY and/or WIDEVINE, as described above.

Displaying the video data, in operation 310 may include, in operation 312, receiving from a server computer (e.g., 110) a license to decode the security encoding of the video file. (Those having skill in the art will acknowledge that a server providing the license may be distinct from the server providing the video file, which may in turn be distinct from a server providing a document image.) The decoding license may be received in response to a request for the license, transmitting to the server computer, upon detecting that the document includes a predetermined security parameter. Alternatively, a decoding license may be stored by the receiving computer, e.g., from a prior request. In operation 314, the operation 310 of displaying the encoded video data may include decoding the security encoding. Playing the video without decoding the security encoding may present the background region using a second color (e.g., black). Although black text on a white background is contemplated as a common document scheme, other color combinations are considered, and those having skill in the art will recognize that, as discussed above, processing of a document and generation of background video data may incorporate other colors.

According to an embodiment, playing or otherwise displaying the video data may include scaling the video data to fit the background region.

The method may further include an operation 320 for displaying, over at least the background region, at least a portion of the content of the electronic document. The portion of the content may be presented in only the second color. For example, the decoded background video may display white as the first color, and the content of the electronic document may be black, as the second color. Other color combinations are considered by the inventors, and in some implementations the colors may be selectable, e.g., for high contrast or light sensitivity, such as white text on a navy background. The operation 320 of displaying the content of the electronic document may include an operation 322 of transmitting to the server computer (e.g., 110) a request to receive document data for the displaying of the at least a portion of the content of the document. According to an embodiment, the operation 320 of displaying the processed document may include an operation 324 of transmitting, to the server computer, browser information identifying at least one of a browser identifier, a browser version, and an operating system type. For example, the request for document may include browser information indicating CHROME or SAFARI, etc., and may identify a type of decryption module available in the browser. In an embodiment, the receiving computer (e.g., 120) may receive, in response to the request for document data for display (in operation 322) the document data and the video data from the server computer (e.g., 110). The video data may include a media stream of the video data or a video file. Playing the video data may include looping playback of the received media stream or video file. In some implementations, the media stream or video file may include a single frame of video data that may be looped. Naturally, looped video data may include multiple frames, alternatively.

The operation 320 of displaying of the at least a portion of content of the document may include an operation 326 of processing the document to cause a background color of the document itself to be indiscernible. Such process may include determining whether the document is monochrome, i.e., having a background of a single first color and content having a single second color. More specifically, similar to the method 200 described above with respect to operations of a server computer (e.g., 110), processing of the document to render the background color of the document indiscernible may alternatively be performed at the receiving computer (e.g., 120), and may include similar operations of determining whether or not the document is monochrome and, if the document is monochrome, removing—or making indiscernible/transparent—the background of the document. If the document is not monochrome, or if the content (e.g., text) of document is not the second color, the method 300 may include operations to convert the document to monochrome to ensure content is displayed in only the second color (e.g., black) and the background is removed—or made indiscernible/transparent.

The method 300 may include a step 330 of detecting a screen capture event or a screen sharing event, such as by intercepting a key stroke or activation of a particular software on the computer. In some systems such detection is automatically performed by the Encrypted Media Extension of the subject browser. When such screen capture or screen sharing event is detected in the computing device, the background video may be changed to the second color. I.e., the background video may transition from the first color to the second color, rendering the second-color content of electronic document indiscernible against the second color background. In some embodiments, the method 300 may include an operation for causing the transition, e.g., switching from a first video clip of the first color to a second video clip of the second color. However, the Encrypted Media Extension may intercept the detected screen capture or screen sharing event and stop decoding the encoded video data. In such embodiment, the method 300 permits, in operation 340 the background region to display the second color such that the content of the document is indiscernible against the second color.

In an embodiment, the method 300 may further include, upon detection of a screen capture event, logging and/or reporting the screen capture event to a predetermined party. For example, the screen capture event may be reported to an owner of the document, an administrator of the serving computer, and/or a data integrity monitor.

Figure 4:
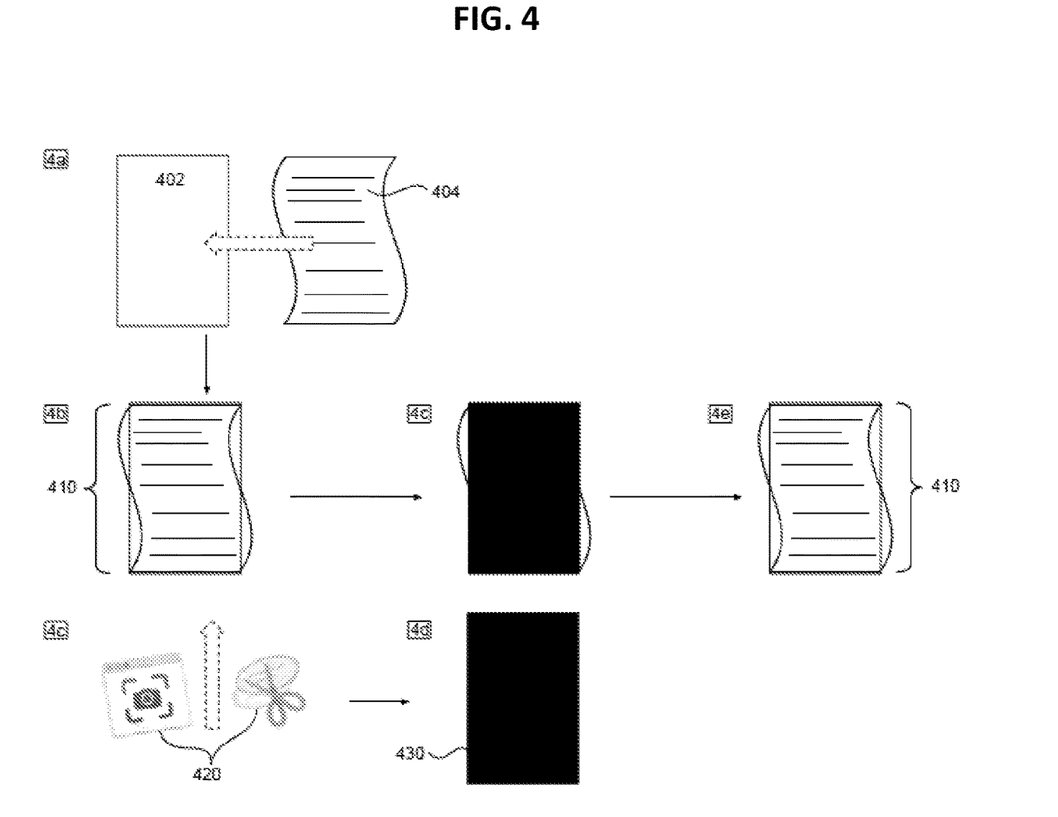
FIG. 4 is diagram of a workflow in a screen capture prevention method, according to an embodiment.

FIG. 4 is diagram of a workflow in a screen capture prevention method, according to an embodiment. In subfigure 4*a*, DRM-protected video data 402 is presented, e.g., on a display screen. An electronic document 404, having a transparent background, is displayed over the DRM protected video data 402 on a web browser, as illustrated in subfigure 4*b*, when the web browser includes a decryption module such as FAIRPLAY, PLAYREAD, or WIDEVINE in compliance with an EME of the browser and compatible with the DRM encryption of the video data. A user sees the combined document and background 410 as a normal document having text in a first color (e.g., black) over a second color (e.g., white). Subfigure 4*c* has two parts: below subfigure 4*b* are elements representing a screen capture tool or event 420, such as activation of the "Snipping Tool" found with various iterations of MICROSOFT WINDOWS or similar tools. When such a tool 420 is activated the EME detects the screen capture event and terminates the decryption of the DRM on the video data. The video appears black, as shown in subfigure 4*c* to the right of 4*b*, rendering the black text or other content of the document 404 indiscernible while the screen capture (or screen recording or screen sharing) tool 420 is engaged. The result of the screen capture (e.g., captured image or video 430) likewise appears black or blank, as shown in subfigure 4*d*. As soon as the screen capture, screen recording, or screen share terminates, the DRM decryption resumes and the combined document and background 410 is viewable as before the screen capture event, as illustrated in subfigure 4*e*.

Figure 5:
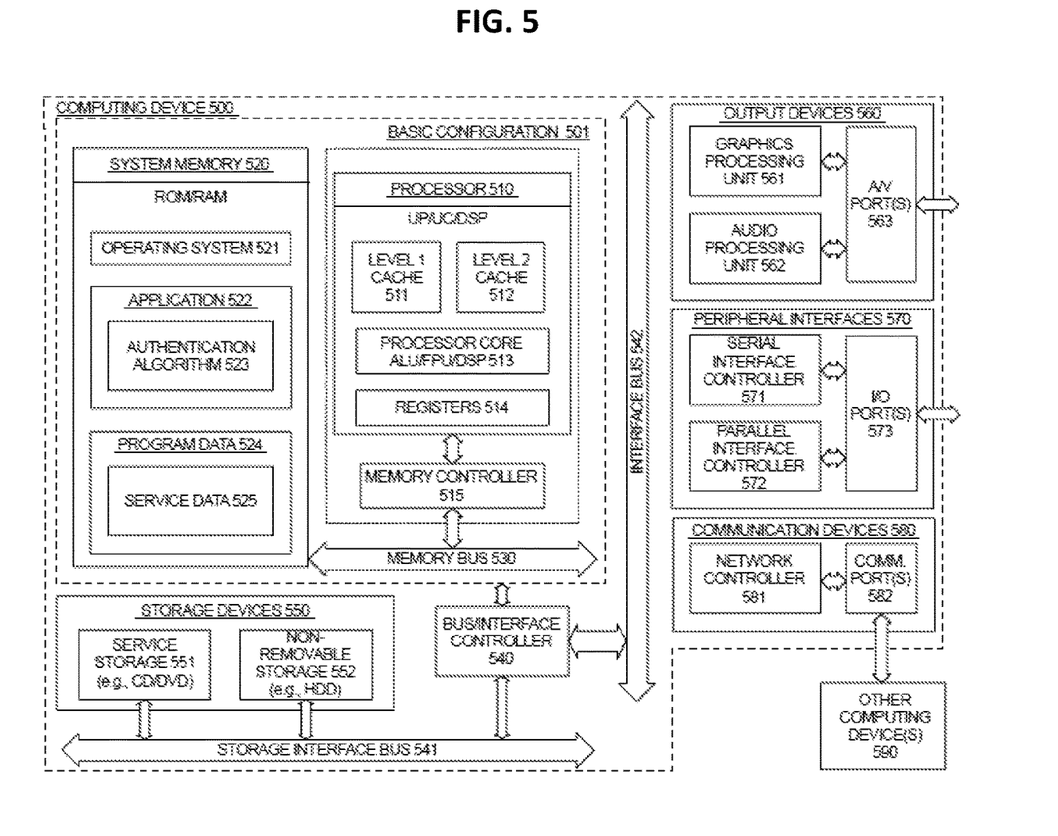
FIG. 5 is a circuit diagram of one aspect of a computing device/controller 500, according to an embodiment.

FIG. 5 is a circuit diagram of one aspect of a computing device/controller 500, according to an embodiment. Each of the server computer 110, receiving computer 120, and sharing computer 170 (in FIG. 1) may include elements of the circuit diagram of FIG. 5. The computing device/controller 500 may operate in conjunction with the elements of the present disclosure. In a very basic configuration of computing device 500, the computing device 500 typically includes one or more processors 510 and a system memory 520. A memory bus 530 can be used for communications between the processor 510 and the system memory 520.

Depending on the desired configuration, the one or more processors 510 of the computing device 500 can be of any type including but not limited to a microprocessor, a microcontroller, a digital signal processor, or any combination thereof. The processor 510 can include one more levels of caching, such as a level one cache 511 and a level two cache 512, a processor core 513, and registers 514. The processor core 513 can include an arithmetic logic unit (ALU), a floating point unit (FPU), a digital signal processing core (DSP Core), or any combination thereof. A memory controller 515 can also be used with the processor 510, or in some implementations the memory controller 515 can be an internal part of the processor 510.

Depending on the desired configuration, the system memory 520 can be of any type including but not limited to volatile memory (such as RAM), non-volatile memory (such as ROM, flash memory, etc.) or any combination thereof. For example, the system memory 520 may include the non-transitory, computer-readable medium noted above for storage of the instructions/operations executable by the server computer 110 and receiving computer 120. System memory 520 typically includes an operating system 521, one or more applications 522, and program data 524. Application 522 includes an authentication algorithm 523. Program Data 524 includes service data 525.

Computing device 500 can have additional features or functionality, and additional interfaces to facilitate communications between the basic configuration 501 and any required devices and interfaces. For example, a bus/interface controller 540 can be used to facilitate communications between the basic configuration 501 and one or more data storage devices 550 via a storage interface bus 541. The data storage devices 550 can be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 500. Any such computer storage media can be part of the computing device 500.

Computing device 500 can also include an interface bus 542 for facilitating communication from various interface devices (e.g., output interfaces, peripheral interfaces, communication interfaces, etc.) to the basic configuration 501 via the bus/interface controller 540. Example output devices 560 include a graphics processing unit 561 and an audio processing unit 562, which can be configured to communicate to various external devices such as a display or speakers via one or more A/V ports 563. Example peripheral interfaces 570 include a serial interface controller 571 or a parallel interface controller 572, which can be configured to communicate with external devices such as input devices (e.g., keyboard, mouse, pen, voice input device, touch input device, etc.) or other peripheral devices (e.g., printer, scanner, etc.) via one or more I/O ports 573. An example communication device 580 includes a network controller 581, which can be arranged to facilitate communications with one or more other computing devices 590 over a network communication via one or more communication ports 582. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 500 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 can also be implemented as a personal computer including both laptop computer and non-laptop computer configurations.

Embodiments of a hardware architecture for implementing certain embodiments are described herein. One embodiment can include one or more computers (e.g., server(s)) communicatively coupled via a computer network, such as but not limited to the Internet. As is known to those skilled in the art, the computer can include a central processing unit ("CPU"), at least one read-only memory ("ROM"), at least one random access memory ("RAM"), at least one hard drive ("HD"), and one or more input/output ("I/O") device (s). The I/O devices can include a keyboard, monitor, printer, electronic pointing device (such as a mouse, trackball, stylus, etc.) or the like. In various embodiments, the computer has access to at least one database over the network.

ROM, RAM and HD are computer memories for storing data and computer-executable instructions executable by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD or the like.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of compiled C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

A "user" refers to one or more entities or people using any of the components and/or elements thereof as described herein. In some embodiments, the user may be a user of an electronic device. In other embodiments, the user may be a user of a computing device. Users described herein are generally either creators of content, managers of content, merchants, and/or consumers. For example, a user can be an administrator, a developer, a group of individuals, a content provider, a consumer, a merchant, a representative of another entity described herein, and/or the like.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations include, but is not limited to: "for example," "for instance," "e.g.," "in one embodiment."

It should be noted that while the examples and embodiments disclosed herein may be limited to certain types of users, environments, etc. (e.g., video conferencing), these limitations are only for purposes of ease of understanding and should not be deemed to limit the disclosure in scope. For example, the disclosed system is not limited to sharing of documents via video conferencing, but instead may be adapted and applied to other markets/industries that currently or may in future involve securing sharing documents between computers.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disc (DVD, a.k.a. Digital Versatile Disc), a digital tape, a computer memory, etc.; and a transmission type medium such as a digital and/or an analog communication medium (e.g., a fiber optic cable, a waveguide, a wired communications link, a wireless communication link, etc.).

What is claimed is:

1. A non-transitory computer readable medium having stored thereon instructions for execution by a server computer, the instructions comprising:
   transmitting video data to a second computing device, the video data depicting only a field in a first color for display, the video data for use as a background for a document to be displayed, and including a security encoding that permits only authorized viewing of the video data;
   transmitting data representing an electronic document to the second computing device for processing of the electronic document by the second computing device to permit display, in a second color, of only the content of the processed document in front of the video data, such that the video data shows through the electronic document as a background color of the document, and
   receiving, processing, and storing the electronic document at the server computer, wherein processing the electronic document includes rendering a background of the document indiscernible, wherein
   rendering the background of the electronic document indiscernible includes:
      determining whether or not the document is monochrome;
      if the electronic document is monochrome, determining whether or not the background color of the electronic document is the first color; and
      if the electronic document is not monochrome, or if the background color of the electronic document is not the first color, converting the electronic document to monochrome, such that the background color is the first color and the content of the electronic document is the second color.

2. The non-transitory computer readable medium according to claim 1, further comprising generating the video data.

3. The non-transitory computer readable medium according to claim 2, wherein generating the video data includes generating a plurality of video data instances each corresponding to a respective security encoding variation.

4. The non-transitory computer readable medium according to claim 3, wherein the transmitting video data to the second computing device includes selecting an instance of the video data from the plurality of video data instances, the instance of the video data being selected based on browser information received from the second computer.

5. The non-transitory computer readable medium according to claim 1, wherein processing the electronic document includes placing in the electronic document a parameter for secure display of the electronic document.

6. The non-transitory computer readable medium according to claim 1, wherein rendering the background of the document indiscernible includes causing the background of the electronic document to be rendered as transparent.

7. The non-transitory computer readable medium according to claim 1, wherein the transmitting data representing the electronic document to the second computer is performed in response to receiving a request to provide document data for presentation of the document file on a display of a second computing device, the electronic document accessible for transmission via the server computer.

8. The non-transitory computer readable medium according to claim 1, further comprising transmitting, to the second computing device, a decoding license for decoding of the security encoding, wherein the transmitting of the decoding license is performed in response to receiving, from the second computing device, a request for the decoding license.

9. The non-transitory computer readable medium according to claim 1, wherein the security encoding complies with an Encrypted Media Extension.

10. The non-transitory computer readable medium according to claim 1, wherein the transmitting video data to the second computing device includes transmitting a media stream of the video data.

11. The non-transitory computer readable medium according to claim 1, wherein the transmitting video data to the second computing device includes transmitting an entire video file to the second computing device.

12. The non-transitory computer readable medium according to claim 1, wherein the video data includes only one video frame.

13. A non-transitory computer readable medium having stored thereon instructions for execution by a computing device, the instructions comprising:
   displaying a background region for at least a portion of content of a document by playing, on a display of the computing device, video data depicting only a first color and including a security encoding;
   displaying, over at least the background region, the at least a portion of the content of the document, the video data depicting the first color showing through the document, the at least a portion of the content being presented in only a second color, said displaying including processing the document to cause a background color of the at least a portion of the content of the document itself to be indiscernible;
   when either of a screen capture event or a screen sharing event is detected in the computing device, permitting the entire background region to display the second color such that the content of the document is indiscernible against the background region, and wherein the processing the document to render the background color of the document indiscernible includes:

determining whether or not the document is monochrome;

if the document is monochrome determining whether or not the background color of the document is the first color;

if the document is not monochrome, or if the background color of the document is not the first color, converting the document to monochrome, such that the background color is the first color and the content of the document is the second color.

14. The non-transitory computer readable medium according to claim 13, wherein said playing the video data includes decoding the security encoding, and wherein playing the video without decoding the security encoding presents the background region using the second color.

15. The non-transitory computer readable medium according to claim 14, further including receiving from a server computer a license to decode the security encoding of the video file.

16. The non-transitory computer readable medium according to claim 15, further including transmitting to the server computer a request for the license upon detecting that the document includes a predetermined security parameter.

17. The non-transitory computer readable medium according to claim 13, wherein said playing the video data includes scaling the video data to fit the background region.

18. The non-transitory computer readable medium according to claim 13, wherein the security encoding complies with a digital rights management (DRM) scheme decodable via an Encrypted Media Extension.

19. The non-transitory computer readable medium according to claim 13, further including transmitting to a server computer a request to receive document data for the displaying of the at least a portion of the content of the document.

20. The non-transitory computer readable medium according to claim 19, further including transmitting, to the server computer, browser information identifying at least one of a browser identifier, a browser version, and an operating system type.

21. The non-transitory computer readable medium according to claim 19, further including receiving the document data and the video data from the server computer in response to the request to receive document data.

22. The non-transitory computer readable medium according to claim 21, wherein receiving the video data includes receiving a media stream of the video data, and said playing the video data includes looping playback of the received media stream.

23. The non-transitory computer readable medium according to claim 21, wherein receiving the video data includes receiving a video file and said playing the video data includes looping playback of the received video file.

24. The non-transitory computer readable medium according to claim 13, wherein the background region corresponds to an entire visible portion of the content of the document.

25. The non-transitory computer readable medium according to claim 13, wherein the playing of the video data includes looping playback of a single video frame.

26. The non-transitory computer readable medium according to claim 13, further comprising: upon detection of a screen capture event, logging the screen capture event and reporting the screen capture event to a predetermined party.

* * * * *